United States Patent [19]

Morinaga et al.

[11] Patent Number: 4,638,225
[45] Date of Patent: Jan. 20, 1987

[54] METHOD AND APPARATUS THEREFOR IN MOTOR SPEED CONTROL

[75] Inventors: Shigeki Morinaga; Kunio Miyashita, both of Hitachi; Hiroshi Hayashida, Mito; Tadashi Takahashi, Hitachi, all of Japan

[73] Assignee: Hitachi, Ltd., Tokyo, Japan

[21] Appl. No.: 824,923

[22] Filed: Jan. 31, 1986

Related U.S. Application Data

[63] Continuation of Ser. No. 597,747, Apr. 6, 1984, abandoned.

[30] Foreign Application Priority Data

Apr. 8, 1983 [JP] Japan ............................ 58-60911

[51] Int. Cl.[4] .............................................. H02P 5/06
[52] U.S. Cl. .................................. 318/341; 318/345 E
[58] Field of Search ............... 318/341, 345 B, 345 E, 318/345 F, 345 A

[56] References Cited

U.S. PATENT DOCUMENTS

| | | |
|---|---|---|
| 4,090,115 | 5/1978 | Franz .................................. 318/341 |
| 4,201,936 | 5/1980 | Roumanis ............................ 318/341 |
| 4,263,557 | 4/1981 | Jarvinen .............................. 318/341 |
| 4,346,434 | 8/1982 | Morinaga ........................ 318/341 X |
| 4,409,534 | 10/1983 | Bose ............................. 318/345 E X |
| 4,413,212 | 11/1983 | Okamoto et al. ................ 318/341 X |

*Primary Examiner*—Benjamin Dobeck
*Attorney, Agent, or Firm*—Antonelli, Terry & Wands

[57] ABSTRACT

A pulse width control apparatus and method for controlling motor speed wherein the number of pulses relating to more speed feedback data is counted so as to control the speed of the motor in accordance with a speed command data and a pulse width modulation signal based on the counted number of pulses. A free-running hardware timer and a soft-timer on a program controlled by an instruction execution time of a microcomputer are arranged so that ON-time data and OFF-time data of the pulse width modulation signal are selectively set in one and the other of the hardware and soft-timers in dependence on values of the ON and OFF times, respectively. The ON and OFF states of the pulse width modulation signal are changed when the contents of the hardware and soft-timers reach predetermined values so as to control the pulse width thereof.

6 Claims, 10 Drawing Figures

METHOD AND APPARATUS THEREFOR IN MOTOR SPEED CONTROL

This application is a continuation of application Ser. No. 597,747, filed Apr. 6, 1984 now abandoned.

BACKGROUND OF THE INVENTION

1. Field of the Invention

The present invention relates to a pulse width control method and an apparatus therefor in motor speed control, and more particularly to a pulse width control method and an apparatus therefor in motor speed control in which a microcomputer and a timer are used and it is made possible to perform pulse width modulation by making the data be set in the timer in complementary relation so as to simplify the apparatus.

2. Description of the Prior Art

Recently, the application of microcomputer has been increased for the purpose of providing high performance in motor control.

Especially, the object of control is a servo motor in an apparatus in the field, for example, of factory automation (FA), office automation (OA), or the like.

As to the motor control, on the other hand, a pulse width control method is mainly used as the main current in the viewpoint of cost reduction, responsibility, or the like, of the control circuit.

Figure 1:
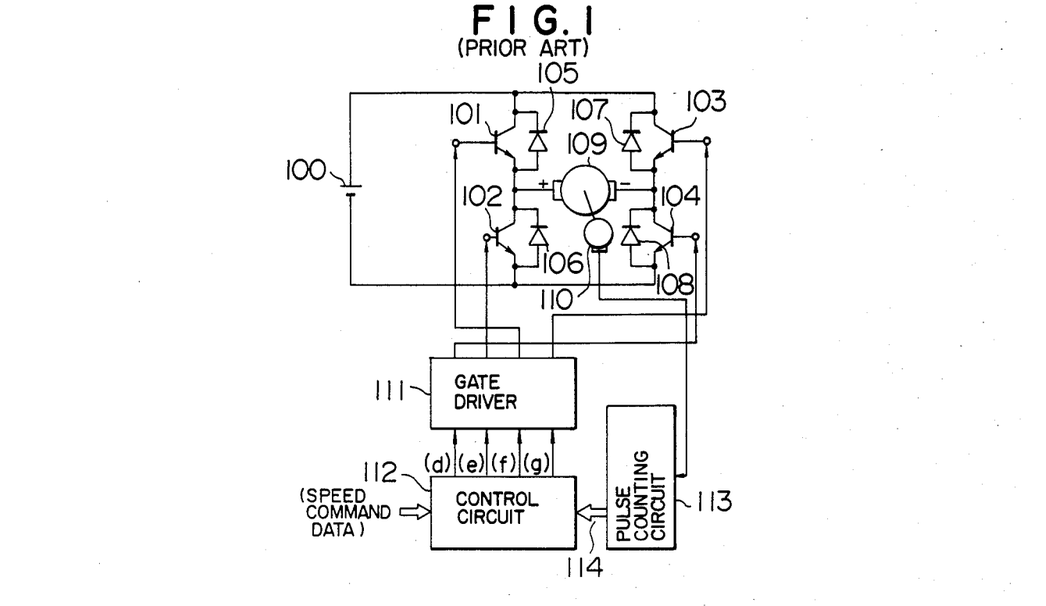
FIG. 1 is a diagram showing a DC motor speed control circuit including a popular pulse width control circuit.

FIG. 1 is a schematic diagram showing the arrangement of a popular speed control circuit employing a DC motor including a pulse width control circuit which has been proposed by the inventors of the present invention.

A DC motor 109 is controlled by four power transistors 101 to 104. That is, upon the turning-on of the power transistors 101 to 104, the motor 109 is supplied with a positive voltage by a DC power source 100 to rotate in the forward direction. It is necessary to control the voltage to the motor to perform the motor speed control, and this is achieved by causing the power transistor 101 or 104 to be subject to pulse width modulation.

It is possible to reverse the rotational direction of the motor 109 by making the power transistors 102 and 103 conductive to thereby supply a negative voltage to the motor 109.

Reference numeral 111 designates a gate driver relating to the base drive for the power transistors 101 to 104, and 105 to 108 designate rectifiers.

The speed detection is performed by counting the pulses of an encoder 110. To this end, the pulse waveform shaping and pulse counting are performed by a pulse counting circuit 113 and the result of count is transferred to a control circuit 112 through a data bus 114. The control circuit 112 includes a microcomputer to perform the speed control by using a software.

Figure 2:
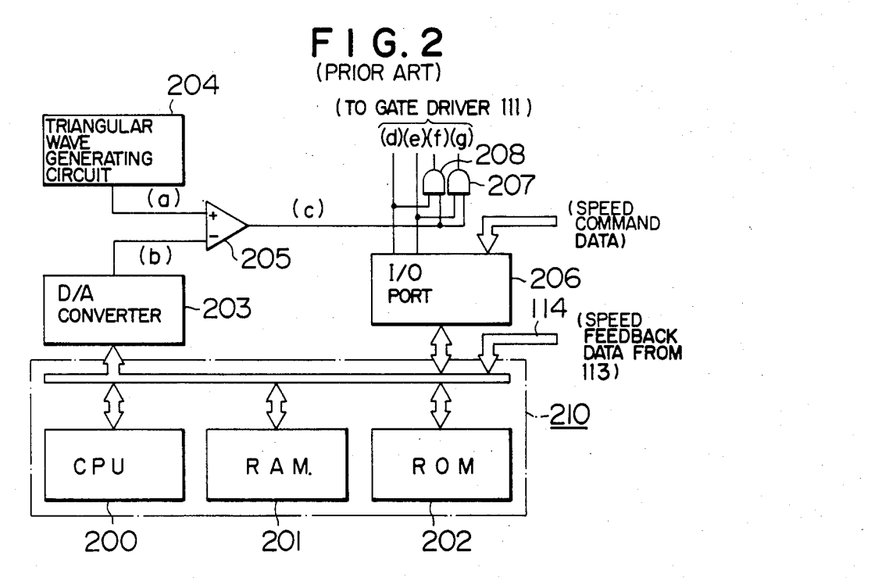
FIG. 2 is a block diagram of a previously developed control circuit.

FIG. 2 is a block diagram of a control circuit which has been proposed by the inventors of the present invention.

A microcomputer 210 is constituted by a central processing unit (CPU) 200, a random access memory (RAM) 201, and a read only memory (ROM) 202, and serves to perform speed control calculation. Reference numeral 203 designates a digital-to-analog (D/A) converter, 204 a triangular wave generating circuit, 205 a comparator, 206 an input/output (I/O) port, and 207 and 208 AND circuits.

Figure 3:
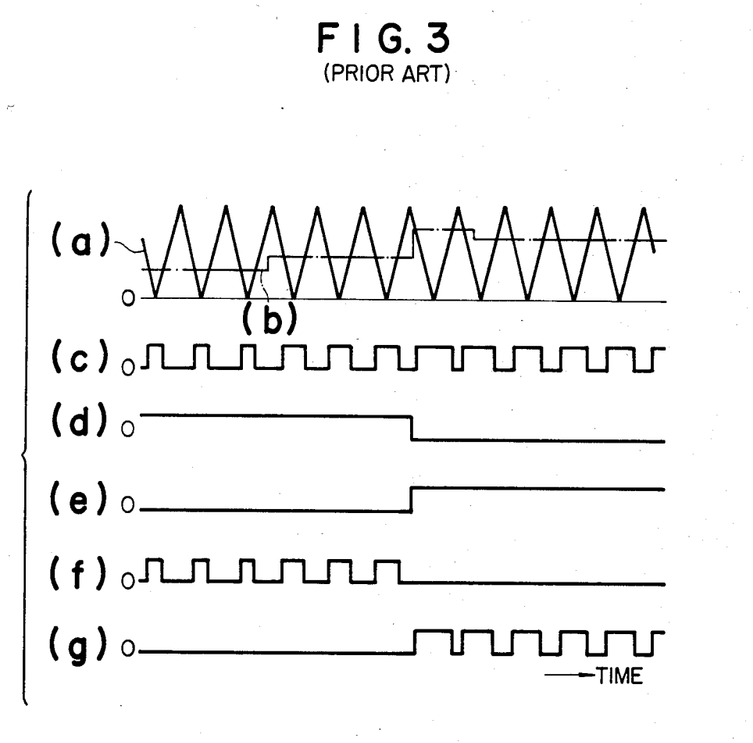
FIG. 3 is a diagram for explaining the operation of FIG. 2.

FIG. 3 is an operation explanatory diagram for the circuit of FIG. 2 and the operation waveform signals (a) to (g) of FIG. 3 are those detected at the portions (a) to (g) of FIG. 2.

The speed command data as shown in FIG. 2 is in the form of digital data and taken into the microcomputer 210 through the I/O port 206. On the other hand, the speed feedback data as shown in FIG. 2 is generated by the pulse measuring circuit 113 of FIG. 1. The microcomputer 210 performs the velocity control calculation on the basis of the speed command data and the speed feedback data to obtain the duty factor of the pulse width modulation and the thus computed data of duty factor is converted into an analog signal by the D/A converter 203. The signal (b) of FIG. 3 shows the analog duty factor signal.

The triangular wave generating circuit 204 generates a carrier wave signal (a) as shown in FIG. 3. The comparator 205 compares the signals (a) and (b) to produce a pulse width modulation fundamental signal (c) as shown in FIG. 3.

The gate signal for the power transistors 101 to 104 of FIG. 1 is formed, as shown in FIG. 1, by the signals (d) and (e) which are the output signals of the I/O port 206, so that the power transistors 101 and 104 are made conductive based on the signal (d) to drive the motor 109 to rotate in the forward direction, while the power transistors 102 and 103 are made conductive based on the signal (e) to drive the motor 109 to rotate in the reverse direction.

The output signal (c) of the comparator 205 is ANDed by the AND circuits 207 and 208 with the above-mentioned signals (d) and (e) for determining the direction of motor rotation to produce pulse width modulation signals (f) and (g) respectively to thereby perform the voltage control for the motor 109.

However, in such a control circuit as shown in FIG. 2, as described above, digital and analog processings are mixed and the pulse width modulation is generated by the analog processing, resulting in a drawback of temperature drifting. Further, in the microcomputer, the computed data is in the form of a digital and a D/A converter is required, resulting in a drawback that the interface becomes complicated.

SUMMARY OF THE INVENTION

An object of the present invention is, therefore, to solve the problems in the previously developed control circuit.

Another object of the present invention is to provide a pulse width control method and an apparatus therefor in motor speed control, in which the temperature drifting is suppressed, in which the calculation is performed only by digital processing without using any analog processing in consideration of the interface for the microcomputer, and in which the arrangement is simplified.

According to an aspect of the present invention, the pulse width control method comprises, in the control wherein the number of pulses relating to the motor speed feedback data is counted so that a pulse width modulation signal is formed by a speed command data and the counted number of pulses, a step of forming the pulse width modulation signal by an ON-time data and an OFF-time data which are in the digital form and which are in the complementary relation with each other.

According to another aspect of the present invention, in a motor speed control circuit constituted by motor speed detecting means, pulse counting means for counting the number of pulses from the speed detecting means, control means for receiving a speed command data and a velocity feedback data based on the pulse counting for performing pulse width control, and drive means controlled by the control means for driving motor operating means, the pulse width control apparatus is arranged such that the above-mentioned control means is constituted by input/output means into which the speed command data is inputted, speed control computing/pulse width modulation duty factor calculating means into which the speed feedback data is inputted, and designation time generating/pulse width modulation signal setting means into which the output of the duty factor calculating means is inputted.

Figure 4:
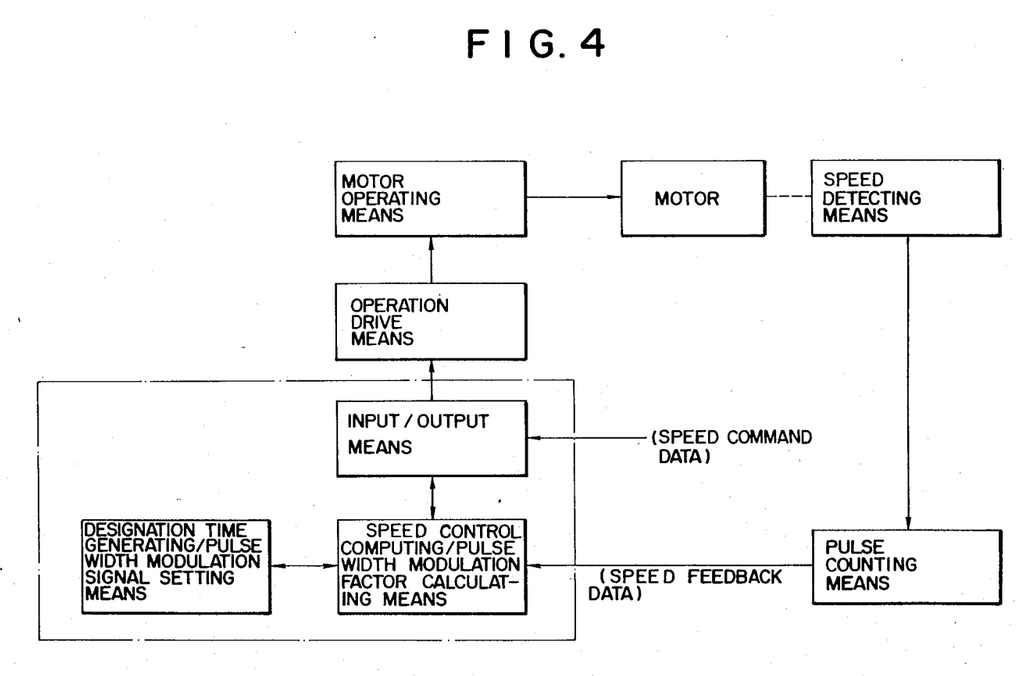
FIG. 4 is a diagram showing the arrangement of the pulse width control apparatus in motor speed control according to the present invention.

FIG. 4 shows the arrangement mentioned above, in which the control means device is surrounded by a one-dotted chain line.

The control device is constituted by input/output means to which a speed command data is inputted, speed control computing/pulse width modulation duty factor calculating means to which a speed feedback data is inputted from pulse counting means, and designation time generating/pulse width modulation signal setting means, whereby the speed control computing/pulse width modulation duty factor calculating means performs the speed control computing on the basis of the speed command data and the speed feedback data so as to obtain a duty factor data for the pulse width modulation, and sets a pulse width modulation signal in the designation time generating/pulse width modulation signal setting means through a pulse width modulation fundamental signal based on the obtained duty factor data, so as to turn the output of the setting means on/off for a predetermined period of time on the basis of the thus obtained pulse width modulation signal, whereby the rotational direction, the speed, etc., of the motor is controlled, the control signal being outputted from the input/output means to the motor operating means through the operation drive means.

DESCRIPTION OF THE PREFERRED EMBODIMENTS

Referring to FIGS. 5 to 10, an embodiment of the pulse width control method and an embodiment of the apparatus therefor, in motor velocity control, according to the present invention will be described hereunder.

Figure 5:
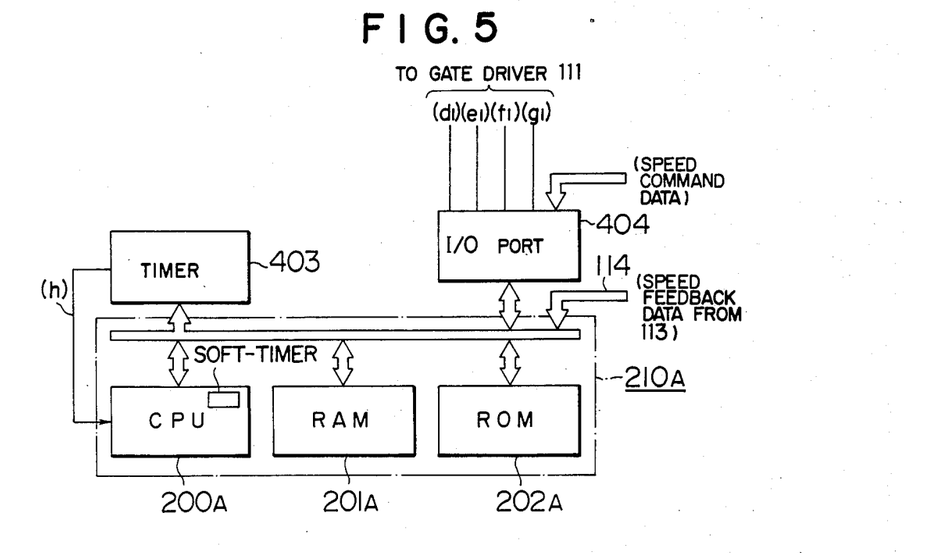
FIG. 5 is a block diagram of an embodiment of the control circuit in the pulse width control apparatus according to the present invention.
Figure 6:
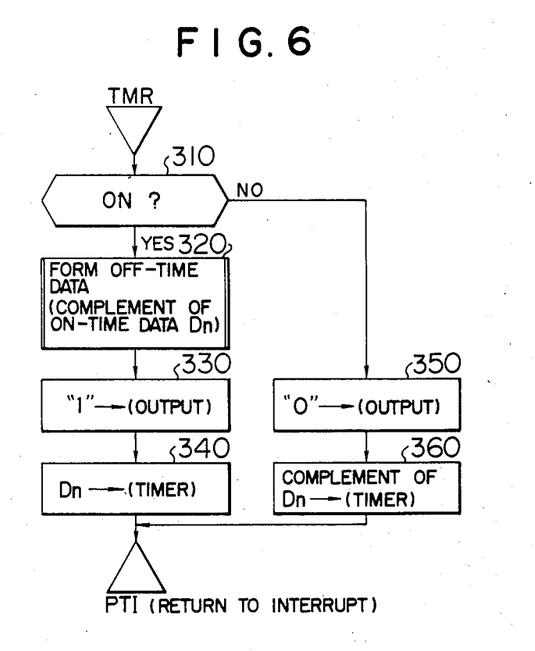
FIG. 6 is a flowchart of timer interruption which is the base of pulse width generation.
Figure 7:
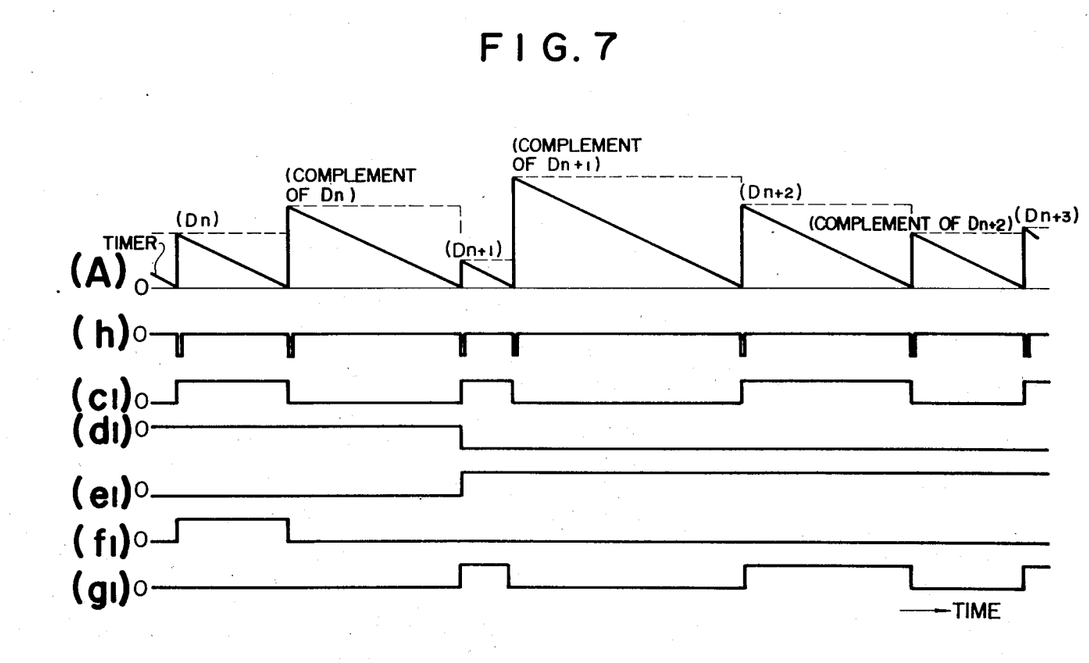
FIG. 7 is a diagram for explaining the pulse width control based on the operation principle of FIG. 6.
Figure 8:
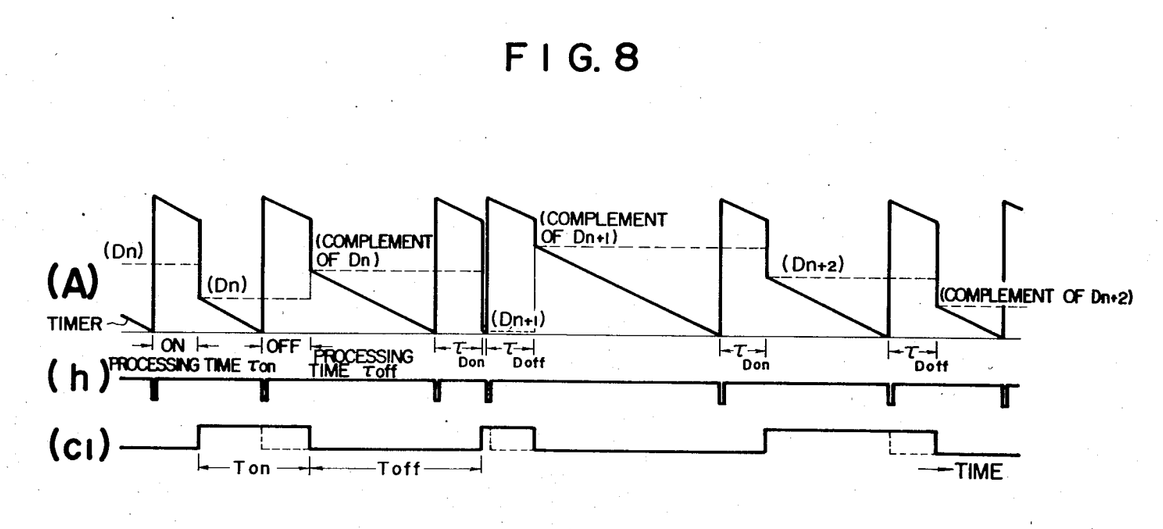
FIG. 8 is a diagram showing in detail the operation based on FIG. 6.
Figure 9:
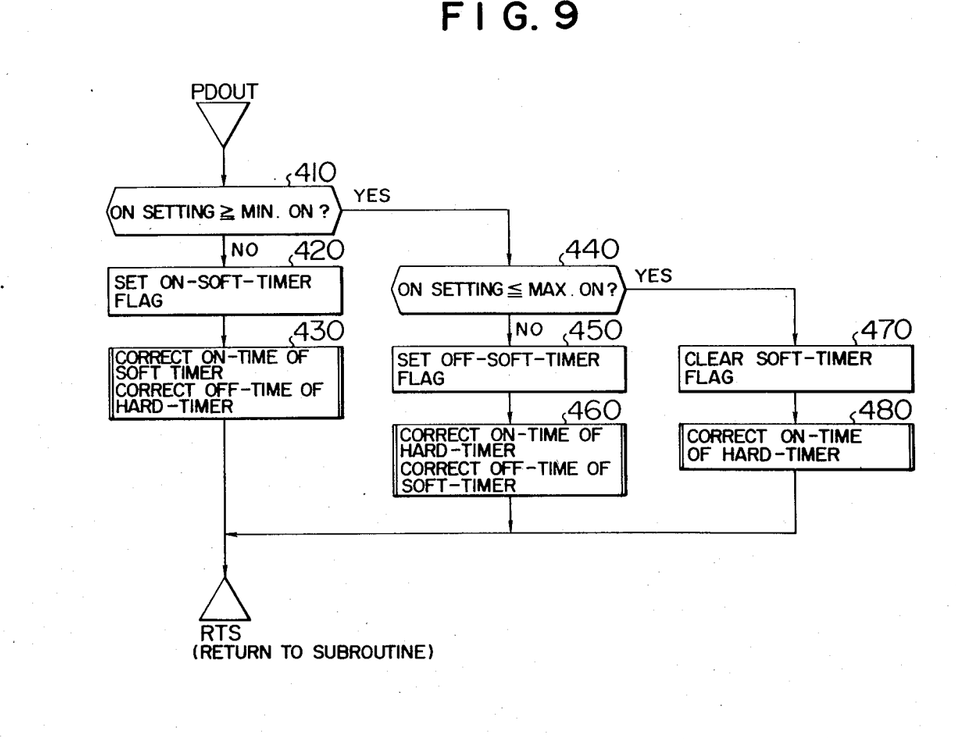
FIG. 9 is a data correction flowchart in the case where both a hard and a soft timer are used.
Figure 10:
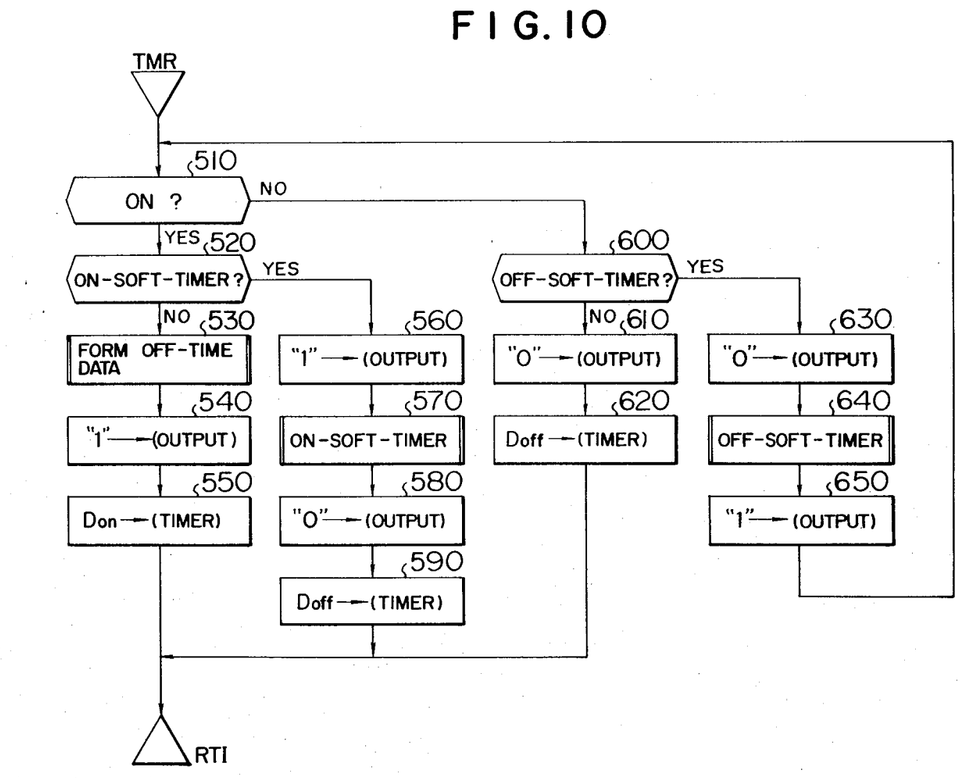
FIG. 10 is a timer interruption flowchart for expanding the voltage control width.

FIG. 5 is a block diagram of an embodiment of the control circuit in the pulse width control apparatus according to the present invention, FIG. 6 is a flowchart of timer interruption which is the base of pulse width generation, FIG. 7 is a diagram for explaining the pulse width control based on the operation principle of FIG. 6, FIG. 8 is a diagram showing in detail the operation based on FIG. 6, FIG. 9 is a data correction flowchart in the case where both a hard- and a soft-timer are used, and FIG. 10 is a timer interruption flowchart for expanding the voltage control width.

In FIG. 5, the same numeral as that used in FIG. 1 designates the same component, while 210A designates a microcomputer constituting the above-mentioned speed control computing/pulse width modulation duty factor calculating means, 200A a CPU, 202A a ROM. Numeral 403 designates a timer (TIMER) constituting the above-mentioned designation time generating/pulse width modulation signal setting means, and 404 designates an I/O port constituting the above-mentioned input/output means. The microcomputer 210A, the I/O port 404, and the time 403 correspond to the control circuit 112. The timer 403 is a hardware free running timer for generating time designated by the microcomputer 210A so as to issue timer interruption to the microcomputer 210A.

In this embodiment, the pulse width modulation signal is generated by using the above-mentioned timer 403 so as to make it possible to eliminate the D/A converter 203, the triangular wave generating circuit 204 and the comparator 205 used in the previously developed circuit as shown in FIG. 2.

In FIG. 5, similarly to the previously developed circuit, the microcomputer 210A performs speed control computing by using the speed command data and the speed feedback data to obtain the duty factor of pulse width modulation, so that a pulse width modulation fundamental signal (c1) as shown later in FIG. 7, the actual gate signals (d1), (e1), (f1), and (g1) described later in connection with FIG. 7 being outputted to the respective power transistors from the I/O port 404.

In FIG. 6, "TMR" designates a flowchart for executing the pulse width control by timer interruption.

FIG. 7 is a diagram for explaining the pulse width control performed by using the above-mentioned timer 403. In FIG. 7, the waveform (A) shows in analog sense the change of digital amount of time to zero in the timer 403, while the broken line shows the digital data as to the time designated by the above-mentioned result of speed control computing.

The timer 403 is the down counter and arranged to generate an interruption request signal (h) as shown in FIG. 7 every time the data becomes zero, so that the microcomputer 210A executes the program of the flowchart TMR as shown in FIG. 6 in response to this timer interruption request signal (h).

That is, in the interruption routine of the flowchart TMR as shown in FIG. 6, the CPU 200A of the microcomputer 210A makes judgement in the step 310 as to whether the pulse width modulation signal is to be turned on at the next step in response to the signal (c1), and if the judgement is made that it is to be turned on, an OFF-time data is formed by using the complement of the ON-time data $D_n$ in the step 320, the OFF-time data is stored in the RAM 201A.

Then, the pulse width modulation signal is turned on ("1"→OUTPUT) and the ON-time data $D_n$ is set in the timer 403, in the steps 330 and 340 respectively, so that the pulse width modulation signal is turned on only for a computed interval time in response to the pulse width modulation signals (f1) and (g1) through the CPU 200A and the I/O port 404.

In the case of turning off the pulse width modulation signal, the pulse width modulation signal is turned off ("0"→OUTPUT) in the step 350 and the OFF-time data (complement of $D_n$) formed in the step 320 is set in the timer 403 so that the pulse width modulation signal is turned off only for a computed interval time in the step 360, similarly to the case mentioned above.

These operations are repeated as shown in FIG. 7 so that the pulse width modulation fundamental signal (c1) is generated and the pulse width modulation signal is turned on/off. That is, the signal (h) shown in FIG. 7 is the timer interruption request signal as described above and the interruption routine of FIG. 6 is executed in response to this signal (h).

The signal (c1) is an above-mentioned pulse width modulation fundamental signal and the rotational direction of and the voltage applied to the motor 109 can be controlled based on this signal (c1).

That is, the signals (d1) to (g1) are the gate signals for the power transistors 101 to 104 respectively, the signals (d1) and (e1) being those for determining the rotational direction of the motor 109 and the signals (f1) and (g1) being the pulse width modulation signals for controlling the voltage applied to the motor 109. These signals (d1) to (g1) are formed on the basis of the signal (c1), similarly to the case of FIG. 3.

Thus, the ON and OFF time data to be set in the timer are made to have complementary relation therebetween to enable the pulse width modulation to be performed. In the present invention, if the ON and OFF time data are three bit data, for example, the complementary relation shows that when the ON data is (1,0,0), the OFF data can be represented as (0,1,1) so as to satisfy the relation that the sum of the ON and OFF data are always (1,1,1).

In the case of FIG. 7, the ON-time of the ON-time data can be desirely selected to improve the pulse width modulation, because the judgement of output and the ON/OFF are performed by a software (on program) of the microcomputer 210A, that is, because processing time is required for the judgement, etc.

This will be explained in detail by referring to FIG. 8.

In FIG. 8, the processing time includes the ON-processing time $\tau_{Don}$ and the OFF-processing time $\tau_{Doff}$. Accordingly, the actual ON-time and OFF-time become different from the ON-time data $D_n$ and OFF-time data (complements of the ON-time data $D_n$) which are shown by a broken line and applied to the microcomputer 210A. In this case, the actual ON-time $T_{on}$ and actual OFF-time $T_{off}$ are as follows:

$$T_{on} = (D_n) \cdot \tau + \tau_{Doff} \quad (1)$$

$$T_{off} = (\text{complement of } D_n) \cdot \tau + \tau_{Don} \quad (2)$$

where $(D_n)$ is the ON-time data given by the microcomputer 210 and $\tau$ is the counting time of the timer 403.

The ON-and OFF-processing times $\tau_{Don}$ and $\tau_{Doff}$ are necessarily required time for executing the program.

Accordingly, it becomes necessary to correct the ON-time data ($D_n$) and the OFF-time data (complement of $D_n$). The corrected ON-time data ($D_n$) and the corrected OFF-time data (complement of $D_n$) to be set into the timer 403 are expressed as follows on the basis of the equations (1) and (2):

$$D_{on} = D_n - \tau_{Doff}/\tau \quad (3)$$

$$D_{off} = (\text{complement of } D_n) - \tau_{Don}/\tau \quad (4)$$

As seen in the equations (3) and (4), data can not be set into the timer in the case where $D_n - \tau_{Doff}/\tau < 0$, and (complement of $D_n$) $- \tau_{Don}/\tau < 0$. That is, the ON-time and OFF-time can not be smaller than $\tau_{Don}$ and $\tau_{Doff}$ respectively.

This problem can not be solved only by using the hardware timer 403 and therefore a software timer is employed. The software timer signifies a timer implemented in a program controlled by the instruction execution time of a microcomputer. The software timer and the hardware timer are referred to, in this disclosure, as a soft-timer and a hard-timer respectively to distinguish one from the other.

As the soft-timer, there are provided an ON-soft-timer and an OFF-soft-timer for controlling the ON-time and OFF-time respectively.

The soft-timer and the hard-timer are selectively utilized to generate the ON- and OFF-times in accordance with ON-time period as shown in the three cases in following Table 1:

TABLE 1

| | HARD- AND SOFT-TIMER | |
|---|---|---|
| ON-time | ON-time generation | OFF-time generation |
| $T_{on} \leq T_{min}$ | soft-timer | hard-timer |
| $T_{min} < T_{on} < T_{max}$ | hard-timer | hard-timer |
| $T_{on} \geq T_{max}$ | hard-timer | soft-timer |

In the Table 1, $T_{min}$ and $T_{max}$ represent the minimum ON-time and maximum ON-time respectively.

FIG. 9 shows the data correction flowchart PDOUT in accordance with the Table 1. In FIG. 9, judgement as to the three cases of Table 1 is made in the steps 410 and 440. That is, judgement is made as to whether the setting of the ON-time data $D_n$ is larger than the minimum ON-time $T_{min}$ or not in the step 410. In the case of "NO", that is in the case where the actual ON-time $T_{on}$ is not larger than the minimum ON-time $T_{max}$, the flag for generating ON-time is set and, further, the ON-time of the soft-timer and the OFF-time of the hard-timer are corrected (steps 420 and 430).

In the case "YES" in the step 410, on the contrary, judgement is made as to whether the setting of the ON-time data $D_n$ is smaller than the maximum ON-time $T_{max}$ or not (step 440). If "NO" in the step 440, that is in the case where the actual ON-time $T_{on}$ is not smaller than the maximum ON-time $T_{max}$, the flag for generating OFF-time is set and, further, the ON-time of the hard-timer and the OFF-time of the soft-timer are corrected (steps 450 and 460). In the case "YES" in the step 440, the flag of the soft-timer is cleared and the ON-time of the hard-timer is corrected (steps 470 and 480).

As described above, as the soft-timer, there are provided the ON-soft-timer for generating ON-time and the OFF-soft-timer for generating OFF-time.

FIG. 10 shows the flowchart TMR' which is executed by the signal (h) in response to the hard-timer interruption in the case where the hard-timer and the soft-timer are used. In this flowchart, the ON-soft-timer and the OFF-soft-timer are executed (steps 570 and 640).

In operation, first, judgement is made as to whether the next output is ON or not in response to the timer interruption request (step 510).

If "YES" in the step 510, the ON-soft-timer flag which has been judged in FIG. 9 is judged as to whether the soft-timer is the ON-soft-timer or not (step 520). In the case where the soft-timer is not the ON-soft-timer, that is if "NO" in the step 520, the OFF-time data is formed on the basis of the ON-time data, the output is turned on, and the ON-time data $D_{on}$ is set in the hard-timer (steps 540 and 550). In the case where the soft-timer is ON-soft-timer, that is if "YES" in the step 20, on the contrary, the output is turned on and then the ON-soft-timer is operated for the time given in FIG. 9. Thereafter, the output is turned off and the OFF-time data $D_{off}$ corrected in FIG. 9 is set in the hard-timer (steps 560, 570, 580 and 590).

If the next output is not ON in the previous step 510, on the contrary, the OFF-soft flag which has been judged in FIG. 9 is judged as to whether the soft-timer is the ON-soft-timer or not (step 600). In the case where the soft-timer is not the OFF-soft-timer, that is if "NO" in the step 600, the output is turned off and the OFF-time data $D_{off}$ is set in the hard-timer because the hard-timer is used for generating the OFF-time (steps 610 and 620). In the case where the soft-timer is OFF-soft-timer, that is if "YES" in the step 600, on the contrary, the output is turned off and then the OFF-soft-timer is operated for the time given in FIG. 9. Thereafter, the output is turned on and the operation is turned back to the first step 510 of the flowchart (630, 640 and 650).

As described above, in a microcomputer having a free running timer, the ON-time and the OFF-time are made to have a complementary relation with each other. It becomes possible to control the microcomputer owing to this complementary relation.

Further, there is an advance that smooth and fine control can be made because the soft-timer as well as the hard-timer are used in order to expand the width of voltage control.

Further, in the case a microcomputer is employed in a pulse width control apparatus for a motor, it is possible to suppress the drifting, to reduce the size of the control circuit of the apparatus, and to perform the control in good condition.

According to the present invention, it is possible to provide a pulse width control method and an apparatus therefor in motor speed control, in which the drifting is reduced, the control is executed only by using digital processings without using any analog processings, and the construction is simplified.

We claim:

1. A pulse width control apparatus for controlling motor speed in which the number of pulses relating to motor speed feedback data is counted so as to control the speed of the motor in accordance with speed command data and a generated pulse width modulation signal of variable pulse width based on the counted number of pulses, comprising a free-running hardware timer for generating an interrupt request signal at variable times in dependence upon ON-time data and OFF-time data of the pulse width modulation signal set therein, a microcomputer being responsive to said interrupt request signal from said free running hardware timer for generating the pulse width modulation signal, said microcomputer including means forming a soft-timer implemented in a program controlled by an instruction execution time of said microcomputer, ON-time data and OFF-time data of the pulse width modulation signal being selectively set in one and the other of said hardware timer and said soft-timer means in dependence on values of ON and OFF times, respectively, the ON and OFF states of the pulse width signal being changed when the contents of said hardware timer and soft-timer means reach predetermined values for controlling the pulse width of the generated pulse modulation signal, said microcomputer including means for correcting the ON-time data and OFF-time data set in selected ones of said hardware timer and said soft-timer means in accordance with ON and OFF processing times therefor, and means for determining whether the pulse width modulation signal is to be in the ON or the OFF state when the contents of said hardware timer and said soft-timer means reach the predetermined values.

2. A pulse width control apparatus according to claim 1, wherein said microcomputer selectively sets the ON-time data and OFF-time data in said hardware timer and said soft-timer means in dependence upon the relation of the actual ON-time to maximum and minimum ON times.

3. A method of pulse width control for controlling motor speed comprising the steps of counting the number of pulses relating to motor speed feedback data so as to control the speed of the motor in accordance with speed command data and a pulse width modulation signal based on the counter number of pulses, generating an interrupt request signal at variable times in dependence upon ON-time data and OFF-time data of the pulse width modulation signal set in a free-running hardware timer, generating the pulse width modulation signal by a microcomputer in response to the interrupt request signal from the free-running hardware timer, forming in the microcomputer a soft-timer means implemented in a program controlled by an instruction execution time of the microcomputer, selectively setting in one of the hardware timer and soft-timer means ON-time data and OFF-time data of the pulse width modulation signal in dependence on values of ON and OFF times, respectively, changing the ON and OFF states of the pulse width signal when the contents of the hardware timer and soft-timer means reach predetermined values for controlling the pulse width of generated pulse width modulation signal, correcting the ON-time data and OFF-time data set in selected ones of the hardware timer and the soft-timer means in accordance with ON and OFF processing times therefor, and determining whether the pulse width modulation signal is to be in the ON or the OFF state when the contents of the hardware timer and the soft-timer means reach the predetermined values.

4. A method of pulse width control according to claim 3, wherein the ON-time data and OFF-time data is selectively set in the hardware timer and the soft-timer means in dependence upon the relation of the actual ON time to maximum and minimum ON times.

5. A motor speed control circuit having a pulse width control apparatus comprising motor speed detecting means, pulse counting means for counting the number of pulses from said speed detecting means, control means for receiving speed command data and speed feedback data based upon the pulse counting by said pulse counting means to thereby perform pulse width control by outputting pulses of a variable pulse width, and drive means responsive to the pulses of variable pulse width from said control means for driving motor operating means, said control means including input-/output means in which said speed command data is inputted, speed control computing/pulse width modulation duty factor calculating means to which said speed feedback data is inputted, and designation time generating/pulse width modulation signal setting means for generating designation time to the input to and output from said speed control computing/pulse width modulation duty factor calculating means.

6. A pulse width control apparatus according to claim 5, wherein said speed control computing/pulse width modulation duty factor calculating means includes a microcomputer having means forming a soft-timer implemented in a program controlled by an instruction execution time of said microcomputer, and said designation time generating/pulse width modulation signal setting means includes a hardware free-running timer.

* * * * *